UNITED STATES PATENT OFFICE.

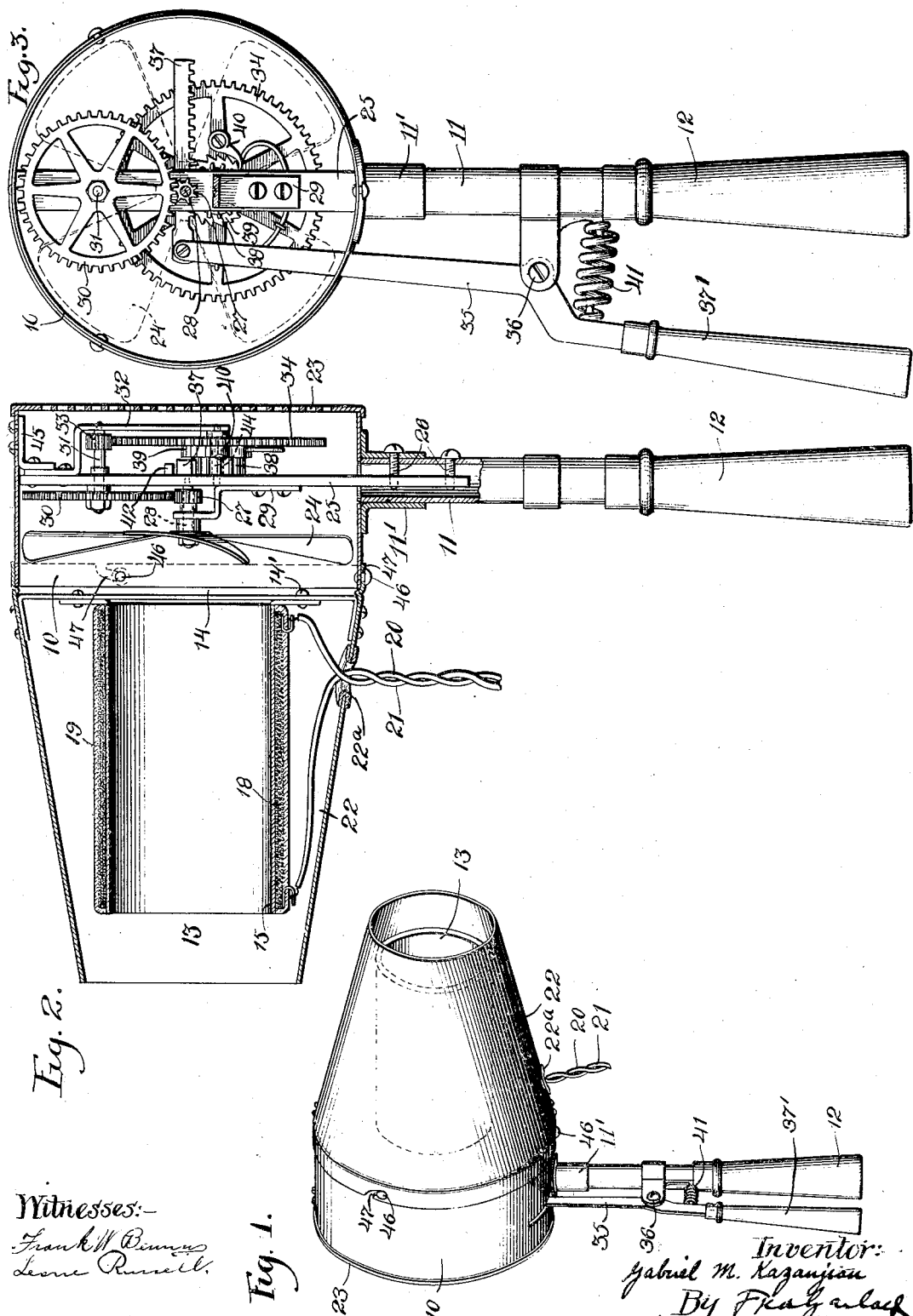

GABRIEL M. KAZANJIAN, OF CHICAGO, ILLINOIS, ASSIGNOR TO ELDRIDGE L. MESSER, OF CHICAGO, ILLINOIS.

HAIR-DRIER.

994,259.

Specification of Letters Patent.

Patented June 6, 1911.

Application filed November 20, 1908. Serial No. 463,543.

*To all whom it may concern:*

Be it known that I, GABRIEL M. KAZANJIAN, a resident of Chicago, in the county of Cook and State of Illinois, have invented certain new and useful Improvements in Hair-Driers, of which the following is a full, clear, and exact description.

The invention relates to hair-driers and more particularly to that type of devices which includes a heater and a fan for forcing a blast of hot air through the heater and which is capable of manual manipulation, so that a lady can conveniently operate the device.

The invention designs to provide an improved hair-drier of this type which is simple in construction and which is well adapted for manipulation by hand to direct the air as desired to the different portions of a lady's head.

The invention further designs to provide an improved device of this type which readily permits the heater to be disconnected or detached, so that when it is desired to dry the hair by means of a current of cool air the heater may be removed and the fan operated manually without the heater.

The invention consists in the several features hereinafter set forth and more particularly defined by claim at the conclusion hereof.

In the drawings: Figure 1 is a perspective of a hair-drier embodying the invention. Fig. 2 is a longitudinal section. Fig. 3 is an end view, the heater-casing or spout being removed and the fan blades being shown in dotted lines.

The improved drier comprises a fan-casing 10 of tubular form open at both ends. A hollow stem 11 is secured to the lower portion of the fan-casing by a collar 11' and a handle 12 is secured to the lower end of the stem. A fan 24 provided with screw-blades is disposed in said casing and adapted to force a current of air longitudinally through the casing. Air is admitted through one end of the casing, which is provided with a screen 23 which serves as a guard for the operating-mechanism. A standard 25 extends vertically across the fan-casing and has its lower end secured in the handle-stem 11, by screws 26.

The operating-mechanism for the fan comprises a pinion 27 secured to a fan-shaft 28 which is journaled in standard 25 and a bracket 29 secured thereto; a gear-wheel 30 secured to an arbor 31 journaled in standard 25 and a bracket 32 which is secured thereto; a pinion 33 secured to arbor 31; and a gear-wheel 34 which meshes with pinion 33 and is operated by a lever-operated one-way driving-connection. An operating-lever 35 is pivotally connected to the handle-stem, as at 36, and has a handle 37' secured to its lower end adjacent the handle 12, so that the lever-handle may be operated by the same hand used to hold the drier. The lever 35 extends through a slot in the fan-casing and a rack-bar 37 is pivotally connected to the upper end of said lever. The teeth of rack-bar 37 engage a gear-wheel 38 to which is secured a ratchet-wheel 39 which drives the gear-wheel 34 of the fan-operating gear-train by a pawl 40 which is pivoted to said gear-wheel, so that when the upper end of the lever 35 is operated outwardly by pressing the lever-handle toward the handle 12, gear-wheel 38 and ratchet-wheel 39 will operate the fan-operating gear-train and during retraction of the lever, the ratchet-wheel 39 will permit the gear-wheel 34, to continue its rotation. A spring 41 between the handle 12 and the lever 35 serves to retract said lever. Thus, by operating the lever-handle 37 intermittently, substantially continuous rotation at a comparatively high speed will be imparted to the fan 24. A lug 42 on standard 25 guides the rack 37 to hold it in operative relation with the gear-wheel 38. Gear-wheel 34 is secured to an arbor 44 which is journaled in standard 25 and the lower end of bracket 32, and gear-wheel 38 and ratchet-wheel 39 are loosely mounted on said arbor. A lug 45 is secured to the upper end of standard 25 and to the fan-casing to secure the standard at its upper end. The end of the fan-casing opposite the screen is open so that the air drawn into the casing through screen 23 will pass longitudinally through the tubular fan-casing and out of the opposite end thereof.

A conoidal discharge spout of extension 22 is detachably connected to the fan-casing by means of bayonet-catches comprising screws 46 projecting from the fan-casing and angular slots 47 formed in the edge of the spout, so that the latter may, at will, be connected to or disconnected from, the fan-casing. An electric heater 13 is located in the spout to heat the blast of air forced through the fan-casing by the fan 24. The heater is preferably located in the discharge-spout so that the air will be heated after it has passed through the fan-casing, the purpose being to avoid loss of heat by radiation and to heat the air as close as possible to the discharge end of the spout which is adapted to be brought into close proximity to the hair to be dried. By placing the heater in the discharge spout and detachably connecting the spout to the fan-casing, the fan and its operating-mechanism may be easily disconnected from the heater and used without the heat when it is desired to effect drying by means of a cold or unheated blast of air. Furthermore by employing a tubular fan-casing through which the air is forced longitudinally and by forcing air substantially in a straight line, very little power is required to operate the fan to produce the blast of air.

The electric heater 13 consists of a hollow pipe or core 15, formed of heat-conducting material, such as iron, and a heating-coil 18 wound around the core or pipe 15 and secured thereon by an outer lining of cement 19 which protects it and secures it on the pipe. The pipe is secured centrally within the discharge-spout 22 and in position so that the air will be forced longitudinally through and around the tube 18, by a cross-bar 14, which is riveted to the spout and secured to the heater by screws 14'. The terminals of the coil or helix 18 are suitably connected to conductors 20 and 21 which extend through an eyelet 22ª in the discharge-spout and these conductors are connected in usual manner by a plug to the terminals of an electric circuit.

An important feature of the invention consists in the employment of a rigid pipe or core 15 on which the helix is wound and which is secured to the pipe by a protective lining. As a result of this construction, the pipe and coil are firmly secured in the casing and all danger of breaking the coil is avoided. Furthermore, the entire pipe becomes heated so that a current of air passing therethrough will be heated thereby. Furthermore the greater portion of the heat generated by the coil is confined within the pipe 18 and therefore the discharge-spout does not become so hot that there is danger of burning anything that the spout may come in contact with. Furthermore, the heater is simple in construction and is comparatively light so that the device may be conveniently manipulated by a lady without undue effort.

In operation it is only necessary to grasp the handle 12 and operate the lever-handle 37' by fingers of the same hand by which the device is held. Such operation will cause the fan to be rotated continuously to force a current of air through the fan-casing and through the discharge-spout, the greater portion passing through the heater-pipe 15 so that as the air reaches the discharge end of the spout it will have been heated and the end of the spout may be closely held to the hair to any part to which the blast of hot air is to be applied. In some instances it is desirable to use a blast of cool or unheated air, and this may be done by disconnecting the discharge-spout with the heater therein from the fan-casing. The discharge end of the fan-casing may then be held in close proximity to the part to be dried and a current of air applied thereto.

The invention is not to be understood as restricted to the details described, since these may be modified within the scope of the appended claims without departing from the spirit and scope of the invention.

Having thus described the invention, what I claim as new and desire to secure by Letters Patent, is:

1. In a hair-drier, the combination of a rotary fan, a casing for said fan, a handle secured to the casing and whereby the device may be held, hand-operated driving-mechanism for the fan, a discharge-spout detachably connected to the casing and through which air will be forced by said fan, and a heater in said discharge-spout.

2. In a hair-drier, the combination of a rotary fan, a casing for the fan, a handle secured to the casing and whereby the device may be held, hand-operated fan-driving mechanism, a screen at one end of said casing through which air will be drawn into the casing, the opposite end of the casing being open, a spout detachably connected to said open end, and a heater-tube in said spout and extending longitudinally thereof.

3. In a hair-drier, the combination of a rotary fan, a casing for the fan, a handle secured to the casing and whereby the device may be held, hand-operated fan-driving mechanism, a screen at one end of said casing through which air will be drawn into the casing, the opposite end of the casing being open, a spout-discharge connected to said open end, a heater-tube in said spout and extending longitudinally thereof, a heating-coil wound around said tube and electrical connections for the coil extending through the spout.

4. In a hair-drier, the combination of a rotary fan, a casing for said fan, a handle secured to the casing and whereby the device may be held, fan-operating mechanism comprising a hand-lever adjacent the handle, said casing being tubular and having both of its ends open, a spout extending longitudinally of the casing and detachably connected thereto, and a heater in said spout.

5. In a hair-drier, the combination of a rotary fan, a casing for said fan, a handle secured to the casing and whereby the device may be held, fan-operating mechanism comprising a hand-lever adjacent the handle, a gear-train operated by said lever and disposed in said casing, said casing being tubular and having both of its ends open, a spout extending longitudinally of the casing and detachably connected thereto, and a heater in said spout.

GABRIEL M. KAZANJIAN.

Witnesses:
FRED GARLAND,
LEONE S. RUSSELL.